United States Patent [19]

Jacobson et al.

[11] Patent Number: 4,867,820
[45] Date of Patent: Sep. 19, 1989

[54] PREPARATION OF LAMINATED STRUCTURE CONTAINING AN OPTICAL FIBER

[75] Inventors: Amnon Jacobson, Tel Aviv; Eli Goloub; Jacob Sharony, both of Ramat-Gan, all of Israel

[73] Assignee: ISPRA Isreal Products Research Co. Ltd., Israel

[21] Appl. No.: 89,689

[22] Filed: Aug. 26, 1987

[30] Foreign Application Priority Data

Sep. 11, 1986 [IL] Israel ........................................ 80008

[51] Int. Cl.$^4$ ........................ B32B 17/06; G08B 13/00
[52] U.S. Cl. .................................... 156/101; 156/166; 156/294; 250/227; 340/550; 340/555; 350/96.10
[58] Field of Search .................. 156/99, 101, 102, 106, 156/176, 177, 70, 166, 257, 293, 294; 219/203; 250/227; 340/550, 600, 555; 350/96.10, 96.29, 96.32; 428/256

[56] References Cited

U.S. PATENT DOCUMENTS

| | | | |
|---|---|---|---|
| 3,296,049 | 1/1967 | Davy et al. | 156/99 |
| 3,549,785 | 12/1970 | Timko et al. | 219/203 X |
| 3,641,332 | 2/1972 | Reick et al. | 350/96.32 X |
| 3,740,281 | 6/1973 | Fujiwara | 156/99 |
| 3,947,837 | 3/1976 | Bitterice | 340/550 |
| 4,078,107 | 3/1978 | Bitterice et al. | 156/99 X |
| 4,228,425 | 10/1980 | Cooke | 340/550 |
| 4,367,460 | 1/1983 | Hodara | 340/550 |
| 4,538,527 | 9/1985 | Kitchen | 340/550 X |

*Primary Examiner*—Michael W. Ball
*Assistant Examiner*—David William Herb
*Attorney, Agent, or Firm*—Steinberg & Raskin

[57] ABSTRACT

Procedure for preparing a laminated plate structure having an optical fiber situated therein, in which the optical fiber is situated between two respective laminating agent layers, in turn situated between two glass plates, the optical fiber extending out from the structure at opposite ends thereof. Grooves are cut out of the laminating agent layers around both opposite ends of the fiber extending out form the structure, with tubes being inserted over these respective opposite ends of the fiber and into the grooves, so that the fibers can move freely within these respective tubes. Then, the tubes and adjoining plates are adhered to one another, with appropriate compression being applied to form the final laminated structure.

3 Claims, 3 Drawing Sheets

PREPARATION OF LAMINATED STRUCTURE CONTAINING AN OPTICAL FIBER

BACKGROUND OF THE INVENTION

The present invention relates to laminated glass plates comprising an optical fibre.

Laminated glass plates to be used as windows are known. In many cases, e.g. in case of a show-window, it is important that the window is provided with means for detecting an attack on said window easily and in short time so that the alarm is actuated immediately.

Windows made of laminated glass plates are also known. However, said known laminated glass plates are not satisfactory as in said known plates a number of separate optical fibres are arranged parallel to each other inside the plate and have to be connected to each other outside the plate. This arrangement is not convenient, cumbersome and not desirable.

It has thus been desirable to design a laminated glass plate comprising an optical fibre which overcomes the above drawbacks.

SUMMARY OF THE INVENTION

The present invention thus consists in a laminated glass plate comprising an optical fibre, which fibre together with the outside control and/or alarm unit forms a closed optical circle.

The form of said closed circle may be any suitable one, e.g a loop, a spiral, a zig-zag, etc. In a zig-zag system, if used, one fibre section is, advantageously, distanced at least 5 cm from the adjacent one.

Any commercially available optical fibre and laminated glass may be used for the plate according to the present invention.

The ends of the optical fibre extending outside the plate may be connected to any suitable emitter and detector.

The size of the plate according to the present invention is not a critical feature thereof. Said size is determined by the requirements of the customer, the size of the manufacturing machine, etc.

The present invention is illustrated herein with reference to a window. However, it is not restricted to such use and may be utilized for any other suitable purpose.

The present invention consists also in a process for the manufacture of the plate according to the present invention which comprises:

a. covering a glass plate with a suitable laminating agent;
 b. putting an optical fibre in a pre-determined form on said laminated glass;
 c. covering the optical fibre with a further layer of the laminating agent;
 d. cutting grooves of a suitable length out of both laminating layers at the incoming and outgoing ends of the optical fibre;
 e. inserting small tubes into both laminating layers around said ends of the optical fibre into said grooves;
 f. covering the second laminated layer with a second glass plate, the corners near the inlet and outlet of the fibre being rounded (in phase);
 g. adhering the parts of the tubes being within the plates to the adjoining glass plates; and
 h. subjecting the plates to a compressing procedure known per se.

The glass and the laminating agent are those used in the manufacture of commercially available laminated glass. A suitable laminating agent is, e.g., polyvinyl butyral.

The small tubes are made from a material which resists temperatures of at least 150° C., e.g., teflon or certain other plastic substances such as nylon.

The inside diameter of the tubes should be such that it enables free movement of the optical fibre within it in the plate after compression, e.g., about 0.35 mm. The length of each tube is advantageously about 4.5 cm.

BRIEF DESCRIPTION OF THE DRAWINGS

The present invention will now be illustrated with reference to the accompanying drawings without being limited by the same. In said drawings:

FIG. 3b shows a cross-section along line C—C of FIG. 3a;

DESCRIPTION OF THE PREFERRED EMBODIMENTS

Figures 1, 2A:
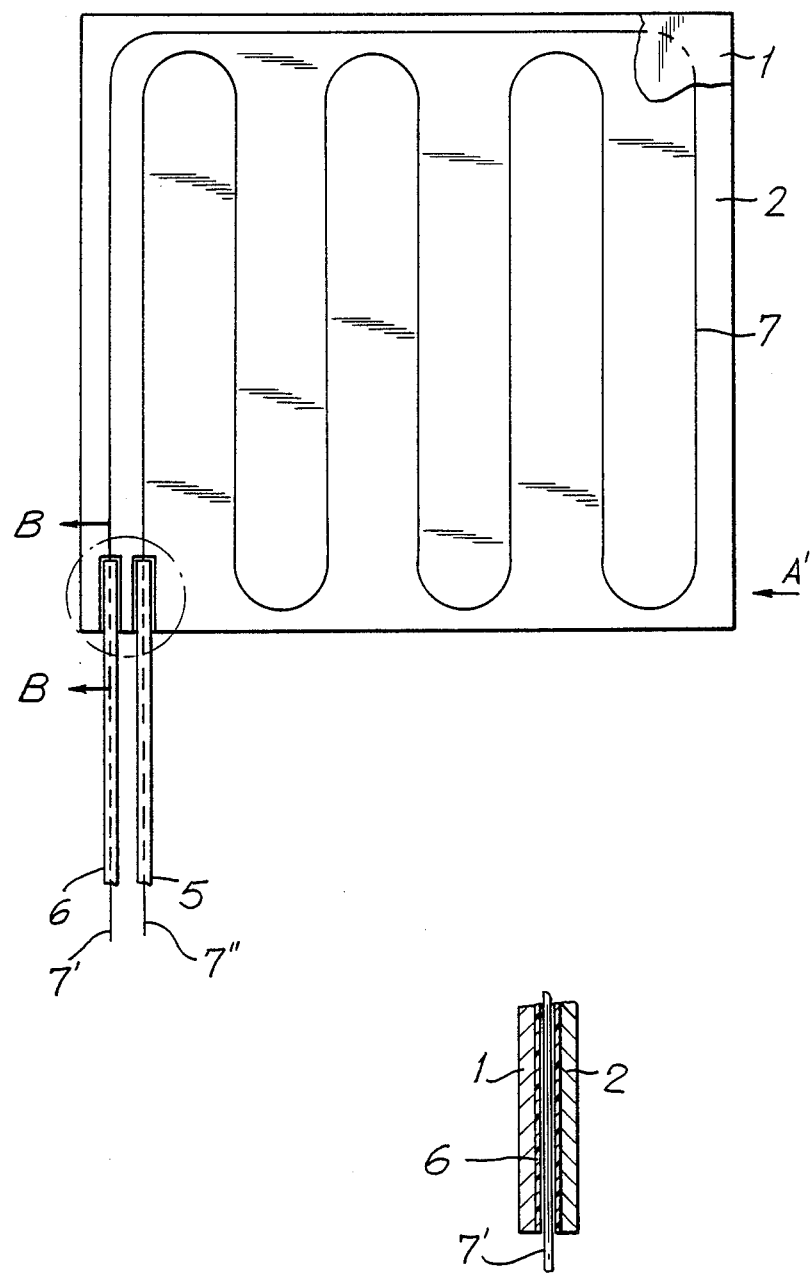
FIG. 1 shows a longitudinal section of a plate according to the present invention.
FIG. 2a shows a view in FIG. 1 in the direction of arrow A'.

The plate shown in FIGS. 1 to 4 comprises glass plates 1 and 2 each having a thickness of 3 mm, laminated layers 3 and 4 having after compression a thickness of 0.4 mm, Teflon tubes 5 and 6 and optical fibre 7. Said optical fibre 7 has a zig-zag form (FIG. 1). Distance of adjacent sections is 8 cm. The optical fibre utilized was type 100/140 having a diameter of 0.25 mm.

Figure 2:
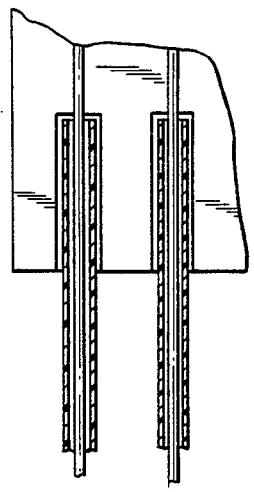
FIG. 2 shows an increased detail A of FIG. 1.
Figure 3A:
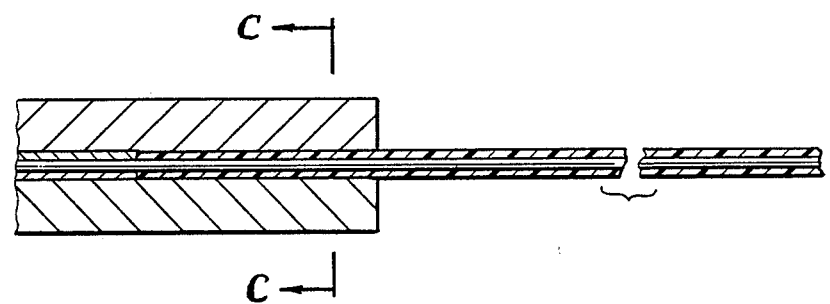
FIG. 3a shows a cross-section view along line B—B of FIG. 1.
Figure 3B:
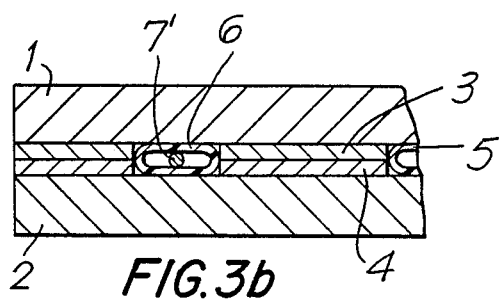
Figure 4:
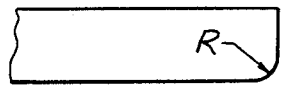
FIG. 4 shows a glass plate with rounded corner (in phase)

The grooves in laminated layers 3 and 4 for tubes 5 and 6 are seen in FIGS. 2, 3a, and 3b.

The rounded corner in glass plate 2 (FIG. 4) has a radius of 1.5 mm.

Figure 5:
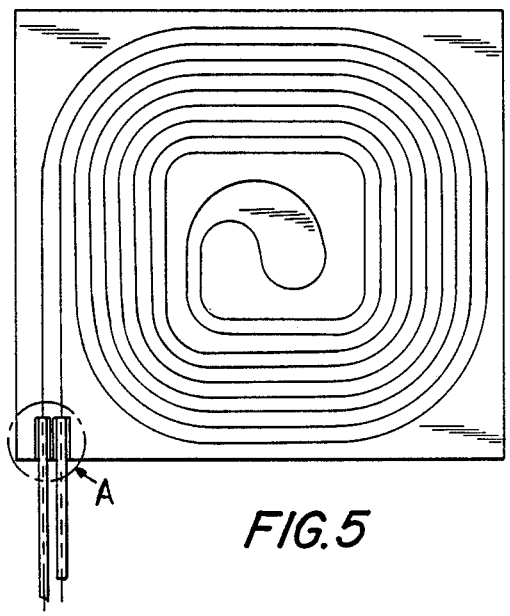
FIG. 5 shows a longitudinal section of another plate according to the present invention.

The plate shown in FIG. 5 differs from that shown in FIG. 1 in that optical fibre 7 has a spiral form.

It is readily understood that ends 7' and 7" are connected to an emitter and detector unit repectively, and together therewith optical fibre 7 forms a closed circle.

We claim:

1. Method for manufacturing a laminated plate structure comprising an optical fibre, comprising the steps of covering a glass plate with a layer of laminating agent, placing an optical fibre having a predetermined pattern on said laminating agent layer, covering said optical fibre with an additional layer of laminating agent, whereby opposite ends of said fibre extend out from said laminating layers, cutting grooves of predetermined dimensions out of both said laminating layers adjacent both said opposite ends of said fibre extending out therefrom, inserting tubes into said thus-cut grooves of said laminating layers and around said respective opposite ends of said fibres, said tubes having inner diameters permitting free movement of a portion of the fibre therewithin after compression, covering said additional laminating layer with an additional glass plate having an edge rounded adjacent said grooves cut in said laminating layers, and then adhering parts of said tubes situated within said thus-cut grooves to said adjoining plates, and compressing said plates to form said laminated structure.

2. The procedure of claim 1, in which both said glass plates have edges rounded adjacent said grooves cut in said laminating layers.

3. The procedure of claim 1, wherein said optical fiber is made of glass.

* * * * *